R. G. STANLEY.
MEANS FOR AUTOMATICALLY CONTROLLING LAMPS ON VEHICLES.
APPLICATION FILED AUG. 14, 1909.

957,010.

Patented May 3, 1910.
2 SHEETS—SHEET 1.

ATTEST
E. M. Fisher
J. C. Museum

INVENTOR
Roy G. Stanley
By Fisher Mort
ATTYS.

R. G. STANLEY.
MEANS FOR AUTOMATICALLY CONTROLLING LAMPS ON VEHICLES.
APPLICATION FILED AUG. 14, 1909.
957,010.
Patented May 3, 1910.
2 SHEETS—SHEET 2.
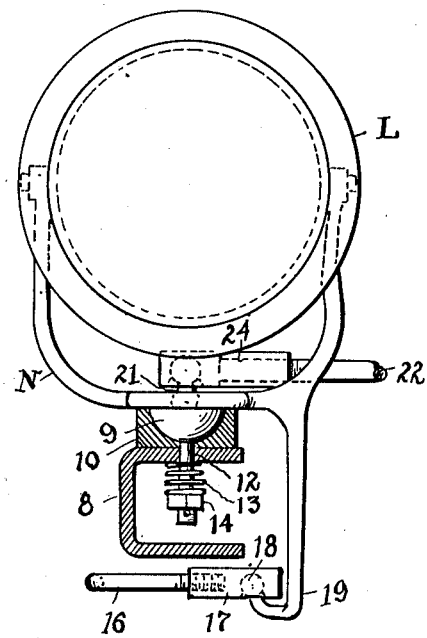
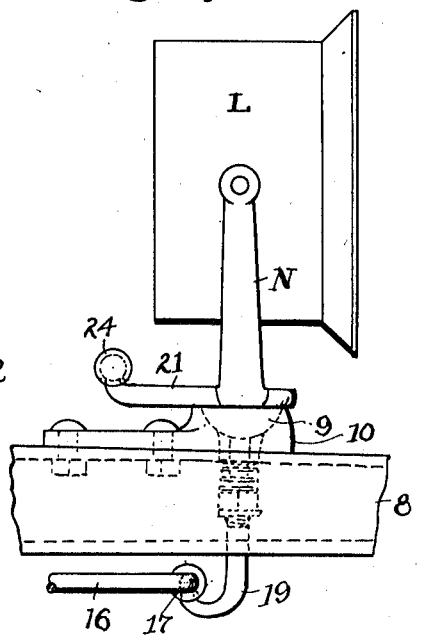
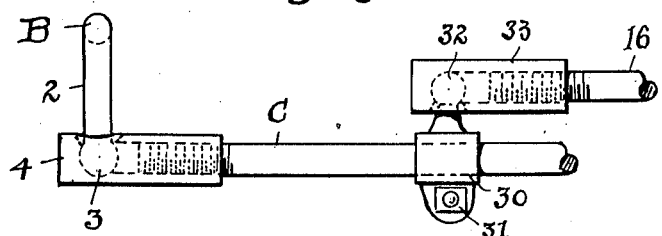
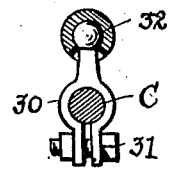
INVENTOR
Roy G Stanley

UNITED STATES PATENT OFFICE.

ROY G. STANLEY, OF CLYDE, OHIO.

MEANS FOR AUTOMATICALLY CONTROLLING LAMPS ON VEHICLES.

957,010.  Specification of Letters Patent.  Patented May 3, 1910.

Application filed August 14, 1909. Serial No. 512,834.

*To all whom it may concern:*

Be it known that I, ROY G. STANLEY, citizen of the United States, residing at Clyde, in the county of Sandusky and State of Ohio, have invented certain new and useful Improvements in Means for Automatically Controlling Lamps on Vehicles, of which the following is a specification.

My invention relates to means for automatically controlling the position of lamps on vehicles, so that they will always throw their light in the direction of travel whether it be in a straight course or on a turn or curve, all substantially as shown and described and particularly pointed out in the claim.

Figure 1:
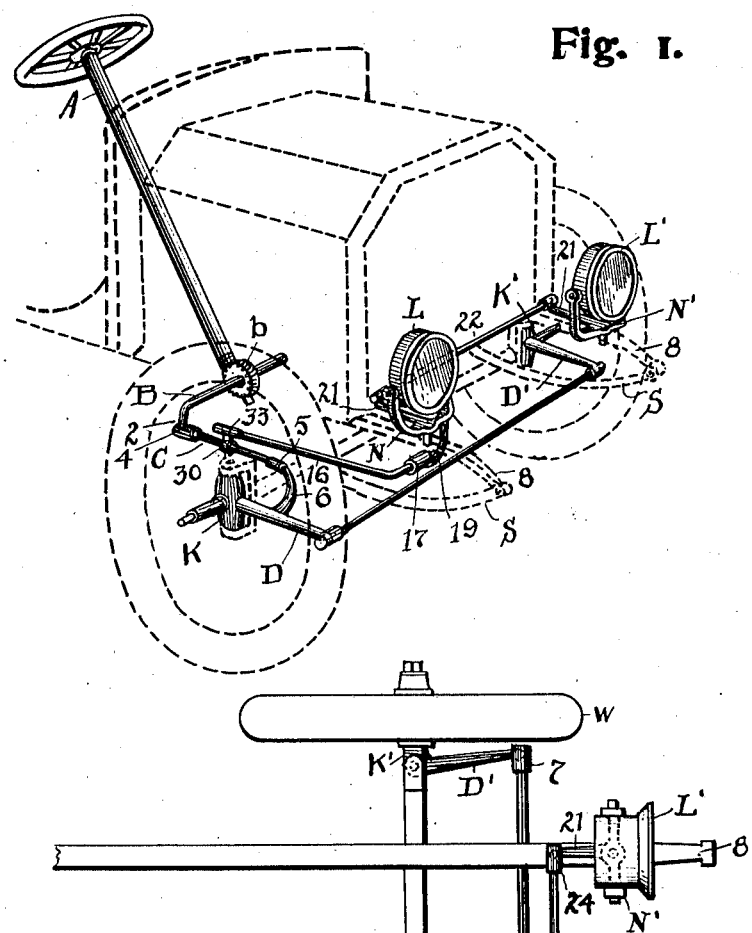
Figure 2:
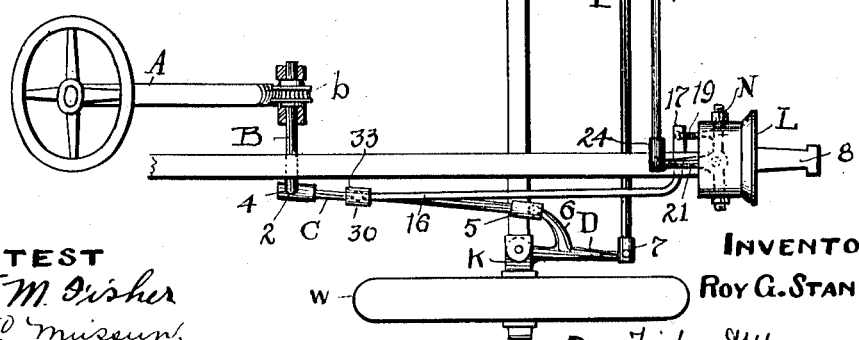

In the accompanying drawings, Figure 1 is a perspective view of the front of an automobile comprising my invention, and Fig. 2 is a plan view thereof. Fig. 3 is a front elevation of a lamp with means for controlling the same, and Fig. 4 is a side elevation thereof. Figs. 5 and 6 are views of details.

The object of the invention is clearly manifest from the foregoing description and views, and comprises especially the means for controlling the lamps from the steering mechanism. Said mechanism may be of the particular construction and arrangement shown herein or the equivalent thereof, and consists, in this instance, in a steering wheel and shaft A, a short rock shaft B having worm gear connection therewith at $b$, an operating link C and arm D on the steering knuckle for front wheel W, a rod or link E connecting arm D of knuckle K with corresponding arm D' of the knuckle K'. As to these parts broadly no novelty is claimed, and yet this construction is materially modified in certain particulars so as to render it available for the novel connection and arrangement of parts comprising my invention and having to do especially with the control of the lamps as will presently appear. For example, I have in plan the adaptation of the invention to the machine in such way that the vibration or movement that comes to the machine naturally in traveling over a road, and which presumably is absorbed in the tires and springs, will not in any event be communicated to the lamps or to the mechanism for automatically controlling the same, thus keeping the lamps quiet and affording a steady and unwavering light. Hence I have introduced novel and original connections in the mechanism as above described whereby vibration, or jarring or the like is absorbed and cannot be transmitted. Thus, it will be seen, first, that short shaft B has a downwardly projecting arm or extension 2 at its outer end provided with a ball 3 engaged in a socket in the socket head 4 threaded on the end of operating link C, and said link has a socket head 5 fixed on its other end and a curved lateral stem 6 on arm D has a ball engaged in said head 5. There are also ball and socket connections between arms D and D' having balls on their ends and cross connecting rod E, which has socket heads 7 at its ends containing said balls. In this way positive operating connections are made between the actual steering parts from the steering rod A to the respective wheels W while at the same time the vibrations in or upon the said mechanism from wheels W is absorbed and lost in said ball and socket connections.

Now, passing to the lamps L and L', it will be seen that they are hung in or upon brackets or yokes N which are in turn supported from or upon the forwardly projecting ends 8 of the main frame of the machine in or by means of semi-spherical balls 9 on the bottom and middle of said yokes resting in corresponding sockets in blocks 10 fixed on said ends, Figs. 3 and 4. It is intended that the said yokes should have more or less horizontal movement as the lamps are turned with the direction of travel and they are held horizontally over on their supports but free to turn under a frictional bearing which aids in the operation. To this end each semi or half ball 9 has a stem 12 at its bottom through bearing block 10 and frame projection 8, and a spring 13 on said stem and a nut 14 below the spring confined by a cotter pin effect such frictional engagement, the tendency of which is to hold the yoke N with the lamp on its seat at any adjusted position until positively shifted through the operating mechanism.

This mechanism proceeds initially from operating link C of the steering parts and comprises a lamp controlling link 16 having a right angled outer end provided with a socket head 17 engaged by a ball 18 on a downwardly projecting arm 19 on lamp yoke N and having an upturned or substantially hook shaped lower end with ball 18 on its point. The said yokes have rearwardly projecting arms 21 of equal length connected by a rod 22, so that if yoke N be rotated it will cause positive and equal rotation of yoke N', and thus the two lamps are controlled together. Here again are socket heads, 24, on the ends of rod 22 and balls on the ends of said arms engaged in said sockets. Finally as to the lamp controlling parts it is necessary that there should be both an adjustable and a free rocking connection between link 16 and link C from which it is operated to the end that the lamps may be set aright as compared with the wheels or be given any desired bias or angle as to the wheels for any reason. To this end I employ a clamp 30 adapted to be adjustably fastened on link C by a bolt and nut 31 through its lower split portion and provided with a ball 32 on its upper end engaged in a socket in socket head 33 on the extremity of link 16.

Now, considering the operation from the foregoing, it will be seen that rocking ball joints are so generally provided in all the connections of both lines of mechanism having to do with steering and the control of the lamps that though the lamps are supported on said projections from the body of the car above the springs S, and the operating connections therefor go back to parts carried by the wheels on a plane beneath said springs, there is no possible vibration or tremor communicated to the lamps and all because the ball joints absorb such effects. Hence the lamps are perfectly quiet and steady in their rays.

What I claim is:

In devices of the kind described, a vehicle frame having forwardly projecting portions at its front and concave sockets immediately upon the top thereof, in combination with lamp supporting yokes provided with substantially semi-spherical balls seated in said sockets and one of said yokes having an arm extending beneath and within the sides of said frame, operating connections with the said arm, and a link connection between said yokes.

In testimony whereof I affix my signature in presence of two witnesses.

ROY G. STANLEY.

Witnesses:
H. G. GIBBONS,
HENRY HOELTZEL.